United States Patent
Bi et al.

(10) Patent No.: US 12,306,367 B1
(45) Date of Patent: May 20, 2025

(54) SWIMMING POOL CLEANING DEVICE AND CLEANING METHOD

(71) Applicant: Aiper Global Pte. Ltd., Singapore (SG)

(72) Inventors: Qingle Bi, Singapore (SG); Minchang Jiang, Singapore (SG)

(73) Assignee: Aiper Global Pte. Ltd., Singapore (SG)

( * ) Notice: Subject to any disclaimer, the term of this patent is extended or adjusted under 35 U.S.C. 154(b) by 0 days.

(21) Appl. No.: 18/889,661

(22) Filed: Sep. 19, 2024

(30) Foreign Application Priority Data

Apr. 10, 2024 (CN) .......................... 202410426622.4

(51) Int. Cl.
*G01V 3/08* (2006.01)
*E04H 4/16* (2006.01)

(52) U.S. Cl.
CPC ........... *G01V 3/088* (2013.01); *E04H 4/1654* (2013.01)

(58) Field of Classification Search
CPC .................................................... E04H 4/1654
See application file for complete search history.

(56) References Cited

U.S. PATENT DOCUMENTS

| | | | |
|---|---|---|---|
| 2009/0232701 A1* | 9/2009 | Porat | E04H 4/1654 422/186.3 |
| 2016/0207204 A1* | 7/2016 | Teuscher | G05D 1/0259 |
| 2024/0271447 A1* | 8/2024 | Besnier | E04H 4/1654 |

FOREIGN PATENT DOCUMENTS

| CN | 220319223 U | 1/2024 | |
|---|---|---|---|
| EP | 1312897 A2 * | 5/2003 | G01F 23/263 |

* cited by examiner

*Primary Examiner* — Natasha N Campbell
(74) *Attorney, Agent, or Firm* — IPRO, PLLC

(57) ABSTRACT

The present disclosure discloses swimming pool cleaning device, including a main body, a detection apparatus and a control system, wherein the detection apparatus is configured to detect an immersion state of the main body, and the control system is configured to control cleaning operations of the main body based on the immersion state; the detection apparatus includes a metal sheet and a controller, wherein the metal sheet is attached to an inner surface of the main body and forms an equivalent capacitance relative to a ground, and the controller is electrically connected to the metal sheet to monitor capacitance changes of the equivalent capacitance and determine the immersion state of the main body. The leaching water detection device can effectively identify whether the swimming pool device is immersed in water, has low cost and good applicability, has little influence on existing structures, and doesn't have the problem of electrolytic corrosion.

17 Claims, 1 Drawing Sheet

SWIMMING POOL CLEANING DEVICE AND CLEANING METHOD

FIELD OF THE INVENTION

The present disclosure relates to the field of swimming pool cleaning device technologies, and in particular to a leaching water monitoring apparatus and monitoring method for a swimming pool device.

BACKGROUND OF THE INVENTION

As is well known, leaching water detection methods used in the existing swimming pool device are generally based on buoyancy block Hall, electrode, or water pump power to determine whether the swimming pool device is immersed in water or out of the water. For example, a patent with an application number of CN202321793123.6 discloses that an immersion state of a swimming pool cleaning device is determined by monitoring water pressure, and the disclosure of which is hereby incorporated in its entirety. These three leaching water detection methods still have some defects.

(1) When using the buoyancy block Hall detection method for leaching water detection, it is generally necessary to carry out additional structural design, which has relatively high cost, and the buoyancy block may get stuck, and thus there is a relatively high risk of failure. Moreover, due to the participation of mechanical mechanism in monitoring, the sensitivity is relatively low.

(2) When using electrode detection for leaching water detection, there may be a problem of electrode electrolysis. When the electrode is immersed in water and electrified, the electrolysis of the electrode will be a serious problem. After long-term use, the electrode may fail, or will leave a vacancy after corrosion, which will cause the water enter the sealed cavity of the swimming pool device. In addition, since the electrode needs to be connected to the detection circuit and the external environment, this detection method also has relatively high waterproof requirements for swimming pool device.

(3) When using water pump power detection for leaching water detection, if the power of a mechanism driving the water flow is relatively small, a difference in the power consumed by a driving motor of the swimming pool device in the immersion state and the outflow state is not obvious, which may cause misjudgment. At the same time, under specific working conditions and structural restrictions, there is also the problem of misjudgment once there is insufficient water absorption.

SUMMARY OF THE INVENTION

The technical problem to be solved by the present disclosure is to provide a new leaching water monitoring apparatus and monitoring method for a swimming pool cleaning device, so as to solve a problem of poor application effects of existing swimming pool cleaning devices using buoyancy block Hall, electrode or water pump power to perform leaching water detection.

In order to solve the above technical problem, technical solutions of the present disclosure are as follows. A swimming pool cleaning device, including a main body, a detection apparatus and a control system, wherein the detection apparatus is configured to detect an immersion state of the main body, and the control system is configured to control cleaning operations of the main body based on the immersion state; the detection apparatus includes a metal sheet and a controller, wherein the metal sheet is attached to an inner surface of the main body and forms an equivalent capacitance relative to a ground, and the controller is electrically connected to the metal sheet to monitor capacitance changes of the equivalent capacitance and determine the immersion state of the main body based on monitoring results.

Preferably, the inside surface is an inside surface of a sealed cavity of the main body.

Preferably, a capacitance of the equivalent capacitance is related to an immersion state of a housing of the sealed cavity, and the immersion state includes immersion or outflow.

Preferably, monitoring, by the controller, the capacitance changes of the equivalent capacitance includes: monitoring changes of charging time or discharging time of the equivalent capacitance.

Preferably, the controller includes a micro control unit; the controller is located in the sealed cavity.

Preferably, the controller is capable of controlling the equivalent capacitance to discharge electricity before monitoring the changes of the charging time of the equivalent capacitance.

Preferably, the metal sheet is electrically connected to the controller through wires, and the controller includes a power supply; preferably, materials of the main body include rubber or plastic.

Preferably, the charging time or the discharging time is obtained based on sample data monitored by the controller for many times.

Preferably, the control system is capable of starting the cleaning operations after monitoring that the main body is immersed in water and stopping the cleaning operations after monitoring that the main body is out of the water; preferably, the cleaning operations include automatic cleaning.

The present disclosure further protects a swimming pool cleaning method, performing cleaning operations using the above cleaning device, wherein the cleaning operations include automatic cleaning.

The present disclosure further protects an immersion monitoring method for a swimming pool cleaning device, performing immersion or outflow monitoring using the above cleaning device, and performing operations based on monitoring results.

Beneficial effects of the present disclosure are in that traditional swimming pool cleaning devices include a sealed cavity, which is used as a main control room and has waterproof performance, and various MCU, PCB circuit boards or chips are arranged in the sealed cavity. In the present disclosure, a metal sheet is attached to an inner wall of the sealed cavity and forms an equivalent capacitance relative to a ground, and the charging and discharging of the metal sheet are controlled by the MCU. When a housing of the sealed cavity is wetted with water, a capacitance of the equivalent capacitance increases, it is possible to accurately and sensitively monitor whether the cleaning device is in the water by monitoring changes of the capacitance. Since the charging time and the discharging time of the capacitance are in the order of milliseconds, the monitoring is very fast and accurate.

Accordingly, in the present disclosure, a cleaning method and a leaching water detection method for a swimming pool device are also designed, which also have the above advantages and beneficial effects.

DETAILED DESCRIPTION OF THE INVENTION

In order to explain the technical contents, realized objectives and effects of the present disclosure in detail, the following description will be made in combination with embodiments and accompanying drawings.

It is found that leaching water detection methods used in the existing swimming pool device are generally based on buoyancy block Hall, electrode, or water pump power to determine whether the swimming pool device is immersed in water or out of the water. However, there are some problems in the three methods: there are problems of relatively high implementation cost and relatively high risk of failure when using the buoyancy block Hall detection method for leaching water detection; there is a problem of electrode electrolysis using electrode detection for leaching water detection; and there are problems of narrow application scope and possible misjudgment when using water pump power detection for leaching water detection. It can be seen that the current swimming pool device lacks an effective and reliable leaching water detection method.

To this end, in this embodiment, a new swimming pool cleaning device is designed by an inventor, and the swimming pool cleaning device is integrated with a leaching water detection apparatus for a swimming pool device.

The swimming pool device designed in this embodiment is specifically a swimming pool cleaning robot, which can autonomously perform cleaning operations, and includes a main body, a detection apparatus and a control system. The detection apparatus is configured to detect an immersion state of the main body, and the control system is configured to control cleaning operations of the main body based on the immersion state.

Figure 1:
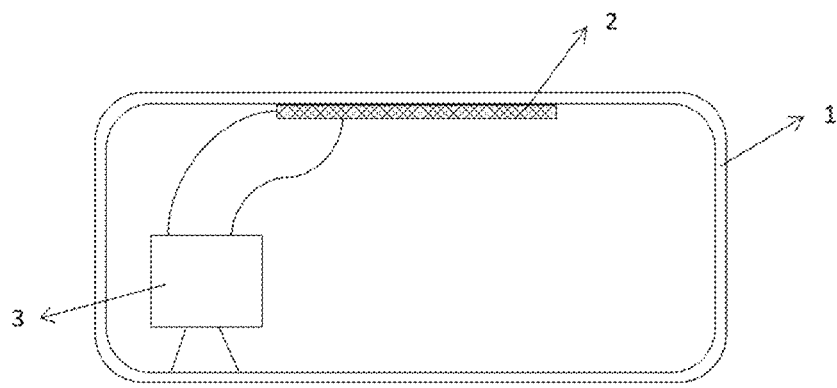
FIG. 1 is a schematic structural diagram of a sealed cavity of a swimming pool cleaning device according to the present disclosure.

As shown in FIG. 1, the swimming pool cleaning robot includes a sealed cavity for sealing various control systems and devices that need waterproofing, for example, a micro control unit (MCU) 3 as a controller, and a metal sheet 2 is attached to an inner wall of a housing 1 of the sealed cavity, preferably to a lower part of the sealed cavity, because when the robot enters the water, a lower side comes into contact with the water first. A length and a width of the metal sheet 2 are between 2 cm and 10 cm, preferably, a metal sheet of 4 CM×4 CM. This size is based on the comprehensive consideration of charging time and discharging time of a capacitance, a spatial position relationship of the outflow detection and cost. The metal sheet 2 is connected to the controller through wires. At this time, the housing 1 of the sealed cavity and external environment of the housing 1 are included between the metal sheet 2 and a ground GND, and the metal sheet 2 forms an equivalent capacitance relative to the ground GND, and the housing of the sealed cavity is generally made of plastic. The MCU can monitor capacitance changes of the equivalent capacitance and determine the immersion state of the main body based on monitoring results.

Figure 2:
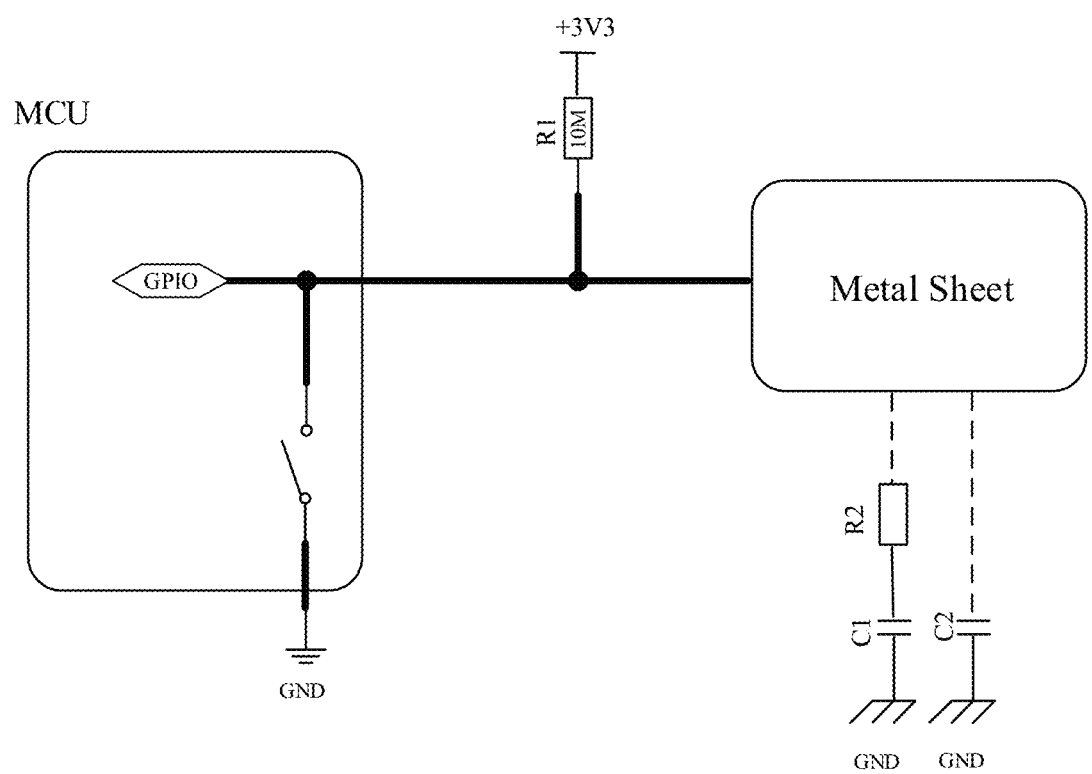
FIG. 2 schematically illustrates a circuit schematic diagram of a detection apparatus of a swimming pool cleaning device according to the present disclosure.

As shown in FIG. 2, a circuit schematic diagram in the sealed cavity is illustrated schematically. The metal sheet 2 has an equivalent capacitance to the ground. Before the robot is immersed in water, the housing of the sealed cavity is not in contact with the water, and there is no conductor on an opposite side of the metal sheet 2 (outside the sealed cavity). At this time, the equivalent capacitance is C2. Ordinary water has certain conductivity. When the robot is immersed in the water, the housing of the sealed cavity is immersed in the water, and water opposite the metal sheet will change the equivalent capacitance to C1. At the same time, the metal sheet has an equivalent resistance R2 relative to the ground, in general, C1>C2. Since the charging time and the discharging time of the capacitance with different capacitance values are different, by discharging and charging the capacitance, and detecting a difference of the charging time or the discharging time, the changes of capacitance can be determined. Based on the changes, it can be determined whether the sealed cavity is immersed in the water, so as to determine whether the robot enters the water or exits the water.

The microcontroller (MCU) is connected to the metal sheet through a wire. One end of the wire is connected to an IO port of the microcontroller (MCU), and the other end of the wire is connected to a power supply of the microcontroller (MCU) through a resistor R1 with a large resistance, and a power supply voltage is +3V. The IO port of the MCU is also connected to a ground end of the power supply.

The specific steps for monitoring the charging time of the swimming pool cleaning device are as follows.

In step 1, the controller controls the equivalent capacitance of the metal sheet to discharge electricity. The IO port of the MCU is in an open drain output mode and outputs low level. In this mode, charges on the metal sheet will be released to the ground end GND of the power supply through the IO port of the MCU. After the charges on the metal sheet are discharged, the IO port will detect a low level state. This step ensures that the complete charging time of the equivalent capacitance can be monitored next.

In step 2, the controller controls the power supply to charge the equivalent capacitance of the metal sheet. The IO port of the MCU is set to an input state, a discharge path is disconnected, and the power supply will charge the equivalent capacitance corresponding to the metal sheet through R1. At the same time, the MCU starts timing, and stops timing after the IO port detects that a charging level is high, so as to obtain the charging time (generally within 1 millisecond from start timing to the end).

Repeat step 1 to step 2 for many times to obtain a set of charging data (multiple charging times are obtained by continuous sampling, generally 20 times, and actual times can be adjusted according to situations of different models), perform filtering processing on the data to generate a statistical value or an average value; compare the statistical value or the average value with a preset value stored in the controller or a previous set of statistical results to determine whether the capacitance has changed. When the capacitance increases, it means that the sealed cavity is immersed in the water (corresponding to the immersion of the cleaning device), and when the capacitance decreases, it means that the sealed cavity is out of water (corresponding to the outflow of the cleaning device). The control system of the cleaning device is in communication or electrical connection with the controller, and signals of the immersion state monitored by the controller will be sent to the control system. When the immersion state is immersion, the control system controls the main body of the cleaning device to start performing underwater cleaning operations, and when the immersion state is outflow, the control system controls the main body of the cleaning device to stop the underwater cleaning operations.

In addition, the swimming pool cleaning device can also monitor the discharge time of the above equivalent capacitance, and determine whether the sealed cavity is in an immersion state or an outflow state based on the discharge time. When it is necessary to monitor the discharge time:

in step 1, the controller controls the power supply to charge the equivalent capacitance of the metal sheet. The IO port of the MCU is set to an input state, a discharge path is disconnected, and the power supply will charge the equivalent capacitance corresponding to the metal sheet through R1, until it is detected that the IO port is in a high level state.

In step 2, the controller controls the equivalent capacitance of the metal sheet to discharge electricity. The IO port of the MCU is in an open drain output mode and outputs low level, and starts timing at the same time. In this mode, charges on the metal sheet will be released to the ground end GND of the power supply through the IO port of the MCU. After the charges on the metal sheet are discharged, the IO port will detect a low level state, and the timing will end (generally within 1 millisecond from start timing to the end).

Repeat step 1 to step 2 for many times to obtain a set of discharging data (multiple discharging times are obtained by continuous sampling, generally 20 times, and actual times can be adjusted according to situations of different models), perform filtering processing on the data to generate a statistical value or an average value; compare the statistical value or the average value with a preset value stored in the controller or a previous set of statistical results to determine whether the capacitance has changed. When the capacitance increases, it means that the sealed cavity is immersed in the water (corresponding to the immersion of the cleaning device), and when the capacitance decreases, it means that the sealed cavity is out of water (corresponding to the outflow of the cleaning device). The control system of the cleaning device is in communication or electrical connection with the controller, and signals of the immersion state monitored by the controller will be sent to the control system. When the immersion state is immersion, the control system controls the main body of the cleaning device to start performing underwater cleaning operations, and when the immersion state is outflow, the control system controls the main body of the cleaning device to stop the underwater cleaning operations.

In addition, besides determining the changes of the equivalent capacitance by monitoring the charging time and the discharging time of the equivalent capacitance of the metal sheet, the changes of the equivalent capacitance can also be monitored by any other well-known methods, and the present disclosure is not particularly limited.

In summary, it can be seen that in the present disclosure, the inventor has optimally designed a leaching water monitoring apparatus and monitoring method for a swimming pool device. By using a metal conductor and a few peripheral electronic components, inlet/outlet detection of swimming pool device can be realized in cooperation with the microcontroller. The leaching water monitoring method uses few peripheral electronic components, has a relatively low cost and a sensitive response, and can adapt to more types of swimming pool devices and more working conditions, has good applicability and little influence on existing structures, and does not have the problem of electrolytic corrosion. In addition, the leaching water monitoring method is convenient to detect and has relatively high reliability, thereby having good popularization prospect and application value.

The above description is only an embodiment of the present invention and does not limit the patent scope of the present disclosure. All equivalent transformations made by using the contents of the specification and drawings of the present disclosure, or directly or indirectly applied to related technical fields, are equally included in the patent protection scope of the present disclosure.

The invention claimed is:

1. A swimming pool cleaning device, comprising a main body, a detection apparatus and a control system, wherein the detection apparatus is configured to detect an immersion state of the main body, and the control system is configured to control cleaning operations of the main body based on the immersion state;

the detection apparatus comprises a metal sheet and a controller, wherein the metal sheet is attached to an inner surface of the main body and forms an equivalent capacitance relative to a ground, and the controller is electrically connected to the metal sheet to monitor capacitance changes of the equivalent capacitance and determine the immersion state of the main body based on monitoring results, wherein the inner surface is an inside surface of a sealed cavity of the main body.

2. The swimming pool cleaning device according to claim 1, wherein a capacitance of the equivalent capacitance is related to an immersion state of a housing of the sealed cavity, and the immersion state comprises immersion or outflow.

3. The swimming pool cleaning device according to claim 2, wherein the controller is located in the sealed cavity; and the controller comprises a micro control unit.

4. The swimming pool cleaning device according to claim 2, wherein the metal sheet is electrically connected to the controller through wires, and the controller comprises a power supply; and materials of the main body comprise rubber or plastic.

5. The swimming pool cleaning device according to claim 1, wherein monitoring, by the controller, the capacitance changes of the equivalent capacitance comprises: monitoring changes of charging time or discharging time of the equivalent capacitance.

6. The swimming pool cleaning device according to claim 5, wherein the controller is capable of controlling the equivalent capacitance to discharge electricity before monitoring the changes of the charging time of the equivalent capacitance.

7. The swimming pool cleaning device according to claim 5, wherein the metal sheet is electrically connected to the controller through wires, and the controller comprises a power supply; and materials of the main body comprise rubber or plastic.

8. The swimming pool cleaning device according to claim 5, wherein the charging time or the discharging time is obtained based on sample data monitored by the controller for many times.

9. The swimming pool cleaning device according to claim 1, wherein the metal sheet is electrically connected to the controller through wires, and the controller comprises a power supply; and materials of the main body comprise rubber or plastic.

10. The swimming pool cleaning device according to claim 1, wherein the metal sheet is electrically connected to the controller through wires, and the controller comprises a power supply; and materials of the main body comprise rubber or plastic.

11. The swimming pool cleaning device according to claim 1, wherein the control system is capable of starting the cleaning operations after monitoring that the main body is immersed in water and stopping the cleaning operations after monitoring that the main body is out of the water; and the cleaning operations comprise automatic cleaning.

12. A swimming pool cleaning method, performing cleaning operations using the cleaning device according to claim 1, wherein the cleaning operations comprise automatic cleaning.

13. The swimming pool cleaning method according to claim 12, wherein a capacitance of the equivalent capacitance is related to an immersion state of a housing of the sealed cavity, and the immersion state comprises immersion or outflow.

14. The swimming pool cleaning method according to claim 12, wherein monitoring, by the controller, the capacitance changes of the equivalent capacitance comprises: monitoring changes of charging time or discharging time of the equivalent capacitance.

15. An immersion monitoring method for a swimming pool cleaning device, performing immersion or outflow monitoring using the cleaning device according to claim 1, and performing operations based on monitoring results.

16. The immersion monitoring method for a swimming pool cleaning device according to claim 15, wherein a capacitance of the equivalent capacitance is related to an immersion state of a housing of the sealed cavity, and the immersion state comprises immersion or outflow.

17. The immersion monitoring method for a swimming pool cleaning device according to claim 15, wherein monitoring, by the controller, the capacitance changes of the equivalent capacitance comprises: monitoring changes of charging time or discharging time of the equivalent capacitance.

* * * * *